(12) United States Patent
Watanabe et al.

(10) Patent No.: US 10,801,589 B2
(45) Date of Patent: Oct. 13, 2020

(54) CHAIN TENSIONER

(71) Applicant: TSUBAKIMOTO CHAIN CO., Osaka-shi, Osaka (JP)

(72) Inventors: Masanori Watanabe, Osaka (JP); Osamu Yoshida, Osaka (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 311 days.

(21) Appl. No.: 15/961,302

(22) Filed: Apr. 24, 2018

(65) Prior Publication Data

US 2018/0313434 A1 Nov. 1, 2018

(30) Foreign Application Priority Data

Apr. 28, 2017 (JP) ................. 2017-089582

(51) Int. Cl.
*F16H 7/08* (2006.01)

(52) U.S. Cl.
CPC ............. *F16H 7/0848* (2013.01); *F16H 7/08* (2013.01); *F16H 7/0829* (2013.01);
(Continued)

(58) Field of Classification Search
CPC .......... F16H 7/0848; F16H 2007/0812; F16H 2007/0859; F16H 2007/0893; F16H 2007/0895; F16H 2007/0897; F16H 2007/0889; F16H 7/08; F16H 2007/0806; F16H 2007/0808; F16H 2007/0829; F16H 7/0834; F16H 7/0836; F16H 2007/084; F16H 2007/0853
See application file for complete search history.

(56) References Cited

U.S. PATENT DOCUMENTS 5,707,309 A * 1/1998 Simpson ............... F16H 7/08
 474/110
5,785,619 A * 7/1998 Nakakubo ............. F16H 7/08
 474/109
(Continued)

FOREIGN PATENT DOCUMENTS

JP 2002-130401 A 5/2002
JP 2002-235818 A 8/2002
(Continued)

*Primary Examiner* — Michael R Mansen
*Assistant Examiner* — Raveen J Dias
(74) *Attorney, Agent, or Firm* — Westerman, Hattori, Daniels & Adrian, LLP (57) ABSTRACT

The present invention provides a chain tensioner that, while being free from an increase in its size, reduces the number of processing parts and the number of assembling steps and reduces the outflow of oil to an outside. Inside a plunger, an inner sleeve including a check valve unit provided on a side of the inner sleeve facing a pressure oil chamber and a pressure regulating unit provided on an outer periphery of the inner sleeve is arranged. The inner sleeve has a cylinder part and a movement restricting part provided on the side of the inner sleeve facing the pressure oil chamber, and the pressure regulating unit has an annular relief valve slidably fitted onto an outer surface of the cylinder part and slidably contacting on an inner surface of the plunger and a relief spring urging the relief valve to a side of the movement restricting part.

3 Claims, 6 Drawing Sheets

(52) U.S. Cl.
CPC ............... *F16H 2007/0806* (2013.01); *F16H 2007/0808* (2013.01); *F16H 2007/0814* (2013.01); *F16H 2007/0859* (2013.01); *F16H 2007/0872* (2013.01); *F16H 2007/0893* (2013.01)

(56) References Cited

U.S. PATENT DOCUMENTS

| | | | | |
|---|---|---|---|---|
| 5,913,742 | A * | 6/1999 | Nakamura | F16H 7/0848 |
| | | | | 474/110 |
| 5,931,754 | A * | 8/1999 | Stief | F01L 1/02 |
| | | | | 474/109 |
| 2001/0006917 | A1* | 7/2001 | Hashimoto | F16H 7/08 |
| | | | | 474/110 |
| 2002/0052259 | A1 | 5/2002 | Nakakubo et al. | |
| 2002/0169042 | A1 | 11/2002 | Kurohata et al. | |
| 2005/0014587 | A1* | 1/2005 | Konishi | F16H 7/0836 |
| | | | | 474/110 |
| 2006/0063625 | A1* | 3/2006 | Emizu | F16H 7/0836 |
| | | | | 474/110 |
| 2006/0089221 | A1 | 4/2006 | Hashimoto et al. | |
| 2010/0099529 | A1* | 4/2010 | Sato | F16H 7/0836 |
| | | | | 474/110 |
| 2011/0256970 | A1 | 10/2011 | Nakano et al. | |
| 2014/0187367 | A1* | 7/2014 | Todd | F16H 7/0848 |
| | | | | 474/110 |
| 2016/0084359 | A1* | 3/2016 | Wigsten | F16H 7/0848 |
| | | | | 474/110 |
| 2016/0290447 | A1* | 10/2016 | Kunimatsu | F16K 17/02 |
| 2017/0059012 | A1* | 3/2017 | Watanabe | F16H 7/0848 |
| 2017/0130807 | A1* | 5/2017 | Kurematsu | F16H 7/0848 |
| 2017/0138444 | A1* | 5/2017 | Kurematsu | F16H 7/0848 |
| 2018/0180191 | A1* | 6/2018 | Shinoyama | F16K 17/196 |
| 2018/0274638 | A1* | 9/2018 | Watanabe | F16H 7/0848 |
| 2019/0120343 | A1* | 4/2019 | Watanabe | F16H 57/0435 |
| 2019/0257391 | A1* | 8/2019 | Watanabe | F16H 7/08 |

FOREIGN PATENT DOCUMENTS

| | | |
|---|---|---|
| JP | 2002-327810 A | 11/2002 |
| JP | 2006-083977 A | 3/2006 |
| JP | 2006-125430 A | 5/2006 |
| JP | 2011-226534 A | 11/2011 |
| KR | 10-2016-0118934 A | 10/2016 |

* cited by examiner

RELATED ART

Fig. 6

CHAIN TENSIONER

BACKGROUND OF THE INVENTION

1. Field of the Invention

The present invention relates to a chain tensioner including: a tensioner body having a cylindrical plunger accommodating hole, one end of which is opened; a cylindrical plunger slidably inserted into the plunger accommodating hole; and urging means compressing or extending freely and accommodated in a pressure oil chamber, which is formed inside the plunger, in order to urge the plunger to a front side, that is, to urge the plunger in a protruding direction thereof.

2. Description of the Related Art

Conventionally, chain tensioners that appropriately maintain the tension of chains have been ordinarily used. For example, in a chain guide mechanism that performs the sliding guide of a transmission chain such as a roller chain endlessly suspended and wound between sprockets provided at a crankshaft and a camshaft inside an engine room with a traveling guide shoe, a chain tensioner that urges an oscillating chain guide having the traveling guide shoe to appropriately maintain tension has been known as such.

Figure 5:
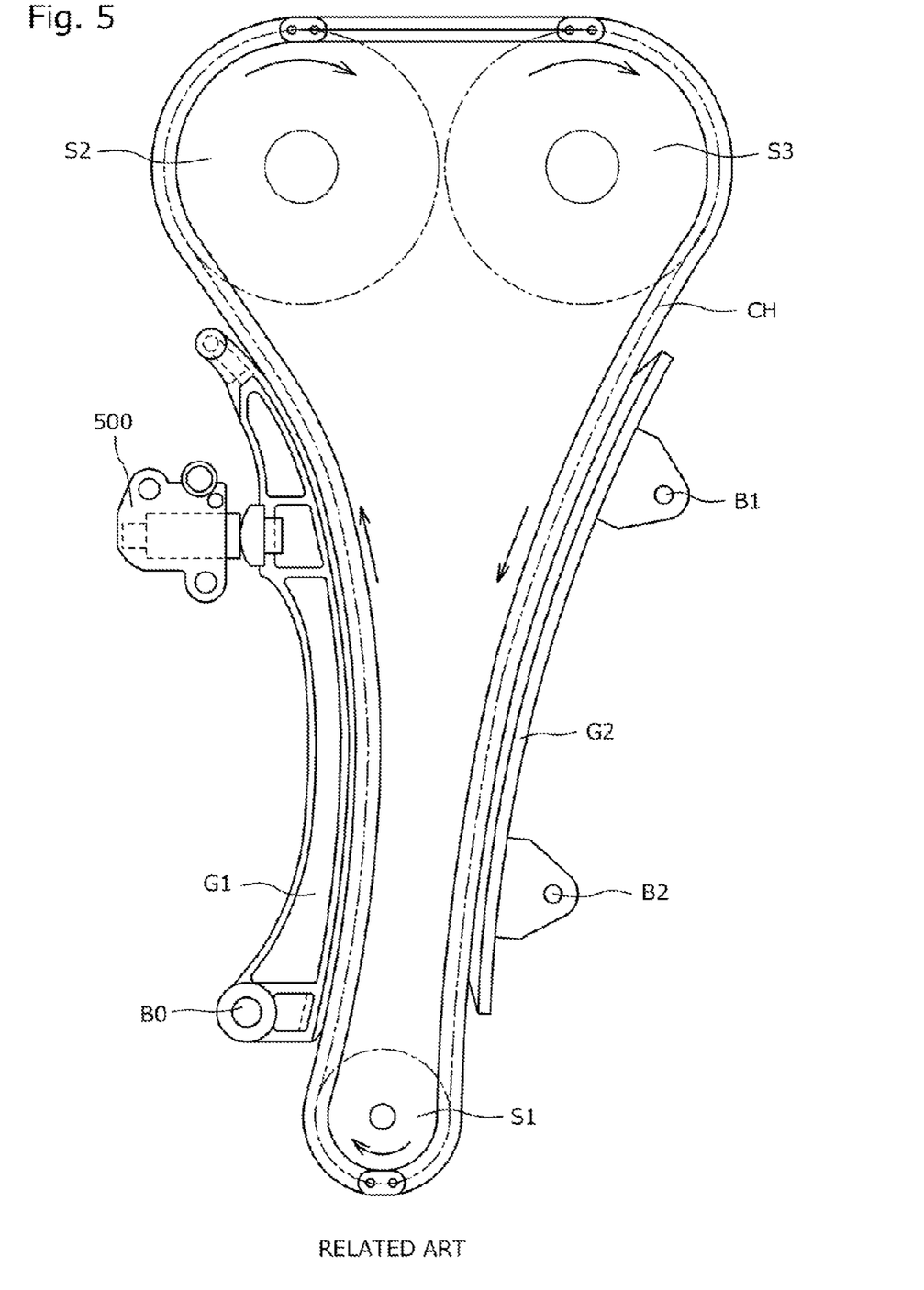
FIG. 5 is an explanatory view of a chain tensioner used in the chain guide mechanism of an engine.

For example, as shown in FIG. 5, a chain guide mechanism is so configured that a timing chain CH is endlessly suspended and wound between a driving sprocket S1 attached at a crankshaft and a pair of driven sprockets S2 and S3 attached at a camshaft inside an engine room, and that the timing chain CH is guided by an oscillating chain guide G1 and a fixed chain guide G2.

The fixed chain guide G2 is fixed inside the engine room by two attachment shafts B1 and B2, and the oscillating chain guide G1 is attached inside the engine room to be capable of oscillating in the suspended and wound plane of the timing chain CH about an attachment shaft B0.

A chain tensioner 500 presses the oscillating chain guide G1 to appropriately maintain the tension of the timing chain CH and prevent the vibration of the timing chain CH.

Figure 6:
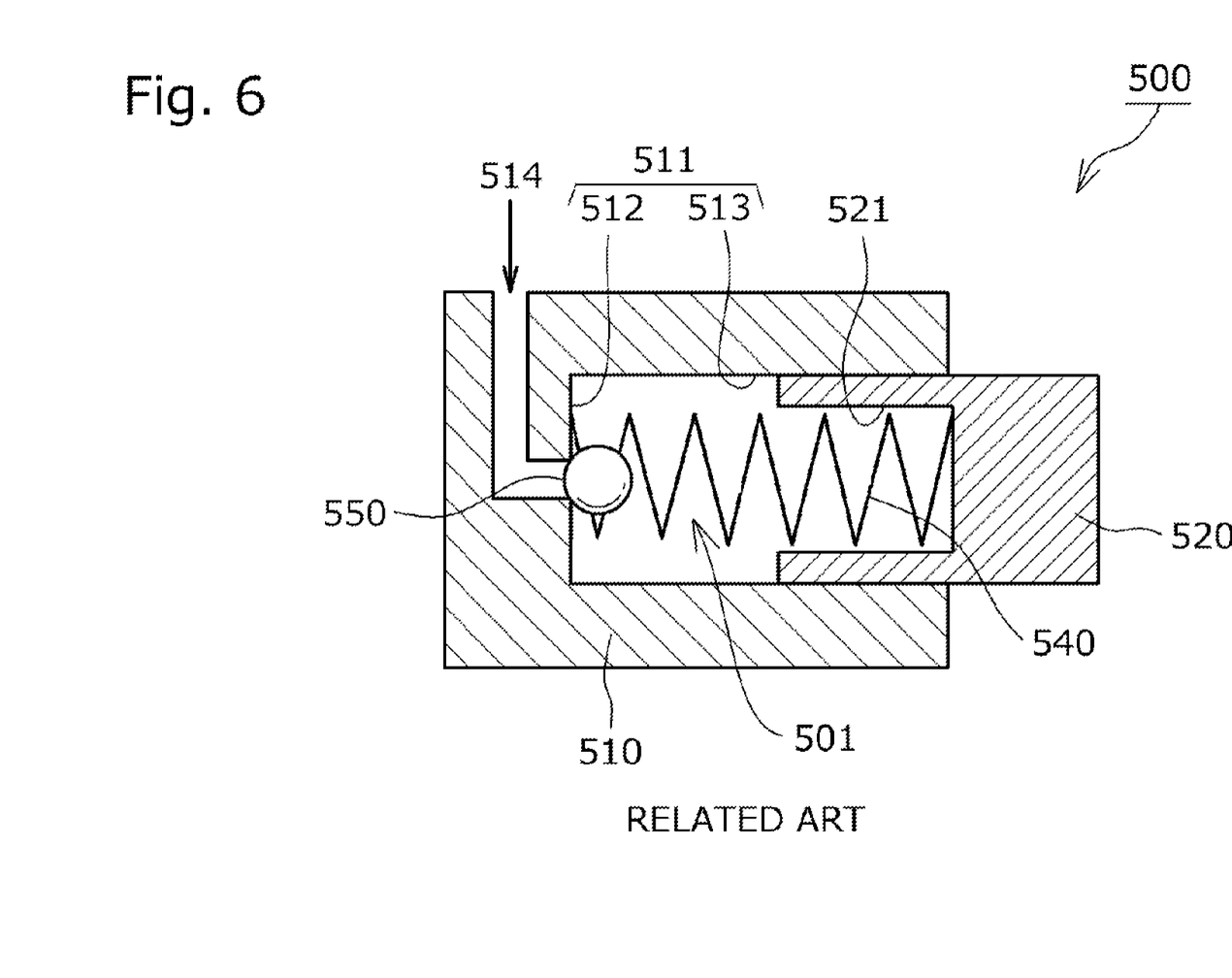
FIG. 6 is a schematic explanatory view of a conventional chain tensioner.

As schematically shown in, for example, FIG. 6, the known chain tensioner 500 used in such a chain guide mechanism includes: a tensioner body 510 having a cylindrical plunger accommodating hole 511, one end of which is opened; a cylindrical plunger 520 slidably inserted into a cylinder surface part 513 of the plunger accommodating hole 511; and urging means for urging the plunger 520 from the plunger accommodating hole 511 to a front side, that is, urging the plunger 520 in a protruding direction thereof.

The urging means is constituted of a coil spring 540 accommodated in a cylindrical concave part 521 of the cylindrical plunger 520 and compressed between the plunger 520 and the bottom part 512 of the plunger accommodating hole 511.

When oil is supplied from an oil supply hole 514 provided on the plunger accommodating hole 511, a pressure oil chamber 501 formed between the plunger accommodating hole 511 and the plunger 520 is filled with the oil. The plunger 520 is urged in the protruding direction by the oil, and the outflow of the oil from the oil supply hole 514 is blocked by a check valve 550 (only a check ball is schematically shown).

Thus, the oil flows through the slight gap between the plunger 520 and the plunger accommodating hole 511 as the plunger 520 reciprocates. By the flow path resistance produced when the oil flows through the slight gap, a damping effect in which the reciprocation of the plunger 520 attenuates is obtained.

When an excessive tensile force is generated in a timing chain in use in such a chain tensioner, the pressure inside a pressure oil chamber becomes excessive. Therefore, there is a likelihood that noise or vibration occurs or the timing chain is damaged.

In order to prevent these problems, chain tensioners including a relief valve that opens when the pressure inside a pressure oil chamber becomes pressure having a prescribed value or higher have been known (see Japanese Patent Application Laid-open Nos. 2002-327810, 2011-226534, 2002-130401, 2002-235818, and 2006-125430).

SUMMARY OF THE INVENTION

In chain tensioners known in, for example, Japanese Patent Application Laid-open Nos. 2002-327810 and 2011-226534, a relief valve is not arranged inside a plunger accommodating hole but is provided on a tensioner body via a separate oil flow path. Therefore, the sizes of the chain tensioners themselves increase, and the number of assembling steps increases with an increase in the number of processing parts.

In chain tensioners known in, for example, Japanese Patent Application Laid-open Nos. 2002-130401, 2002-235818, and 2006-125430, a relief valve is provided inside a plunger. Therefore, an increase in the sizes of the chain tensioners may be avoided. However, the internal structure of a plunger becomes complicated, and the number of assembling steps increases.

In addition, oil released by the relief valve flows out to an outside, and thus the consumption Of oil increases. Therefore, the reinforcement of an oil pump is needed.

The present invention has been made to solve the above problems and has an object of providing a chain tensioner that, while being free from an increase in its size, reduces the number of processing parts and the number of assembling steps and reduces the outflow of oil to an outside.

In order to solve the above problems, an embodiment of the present invention provides a chain tensioner including: a tensioner body having a cylindrical plunger accommodating hole, one end of which is opened; a cylindrical plunger slidably inserted into the plunger accommodating hole; and urging means compressing or extending freely and accommodated in a pressure oil chamber, which is formed inside the plunger, in order to urge the plunger to a front side, that is, to urge the plunger in a protruding direction thereof, wherein an inner sleeve is arranged inside the plunger, the inner sleeve has a check valve unit provided on a side of the inner sleeve facing a pressure oil chamber to prevent backflow of oil flowing out of the pressure oil chamber and a pressure regulating unit provided on an outer periphery of the inner sleeve to prevent pressure inside the pressure oil chamber from having a prescribed value or higher, the inner sleeve has a cylinder part and a movement restricting part provided on the side of the inner sleeve facing the pressure oil chamber, and the pressure regulating unit has an annular relief valve slidably fitted onto an outer surface of the cylinder part and slidably contacting an inner surface of the plunger and a relief spring urging the relief valve to a side of the movement restricting part.

In a chain tensioner according to an embodiment of the present invention, an inner sleeve has a cylinder part and a movement restricting part provided on a side of a pressure oil chamber, and a pressure regulating unit has an annular relief valve slidably fitted onto an outer surface of the cylinder part and slidably contacting an inner surface of a plunger and a relief spring urging the relief valve to a side of the pressure oil chamber. Thus, since the pressure regulating unit may foe accommodated in the space between the outer surface of the inner sleeve and the inner surface of the plunger, an increase in the size of the chain tensioner itself and an increase in the number of processing parts are prevented.

In addition, since the inner sleeve serves as an element of the pressure regulating unit, an increase in the size of the chain tensioner is prevented with a reduction in the number of parts. Therefore, it becomes possible to reduce the number of processing parts and the number of assembling steps.

Moreover, since the chain tensioner is so structured that the release of pressure with the pressure regulating unit is performed toward an oil supply side, the outflow of the oil to an outside is prevented at the release of the pressure and a difference in the pressure between the pressure oil chamber and a release side reduces. Therefore, restoration speed for the closed state of the pressure regulating unit may be improved.

Further, even if the pressure regulating unit operates before the start of supplying the oil such as when an engine starts, the chain tensioner is so structured that the pressure is released toward the oil supply side. Therefore, since the oil circulates without flowing out to the outside, it becomes possible to prevent clattering when the engine starts.

According to another embodiment of the present invention, the relief valve has, on an inner periphery thereof, an inner peripheral sliding contact surface slidingly contacting the cylinder part and a relief groove allowing flow of the oil in a longitudinal direction thereof. Thus, since there is no need to form a relief groove on the plunger and the inner sleeve, it becomes possible to reduce the number of processing steps.

In addition, since it is only necessary to replace the relief valve with a relief valve having a different relief groove shape when a flow rate of the oil is regulated at the release of the pressure, it becomes possible to easily respond to a change in the design of the chain tensioner.

According to another embodiment, of the present invention, the pressure regulating unit has a stopper ring fixed on an outer periphery of the inner sleeve and receiving the relief spring. Thus, since the inner sleeve and the pressure regulating unit may be integrally incorporated into the chain tensioner after being integrated with each other in advance, it becomes possible to reduce the number of assembling steps.

According to another embodiment of the present invention, the inner sleeve has a reserve hole penetrating between an inner periphery and an outer periphery of the cylinder part. Therefore, when the inside of the hollow inner sleeve serves as an oil storage chamber, it is possible to reliably flow back the oil to the oil storage chamber at the release of the pressure.

DESCRIPTION OF THE PREFERRED EMBODIMENT

First Embodiment

Figure 1:
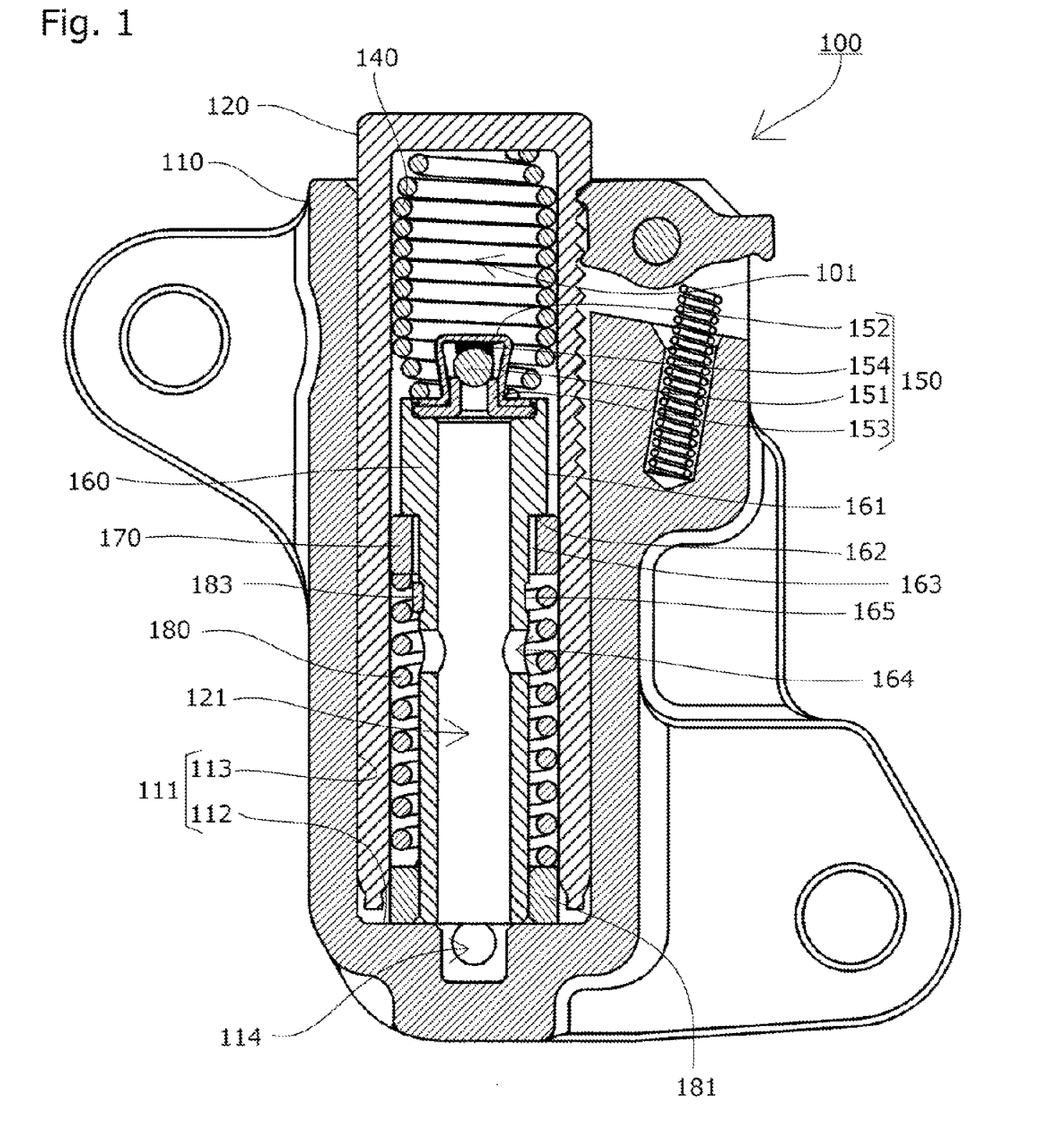
FIG. 1 is a front cross-sectional view of a chain tensioner according to an embodiment of the present invention.
Figure 2:
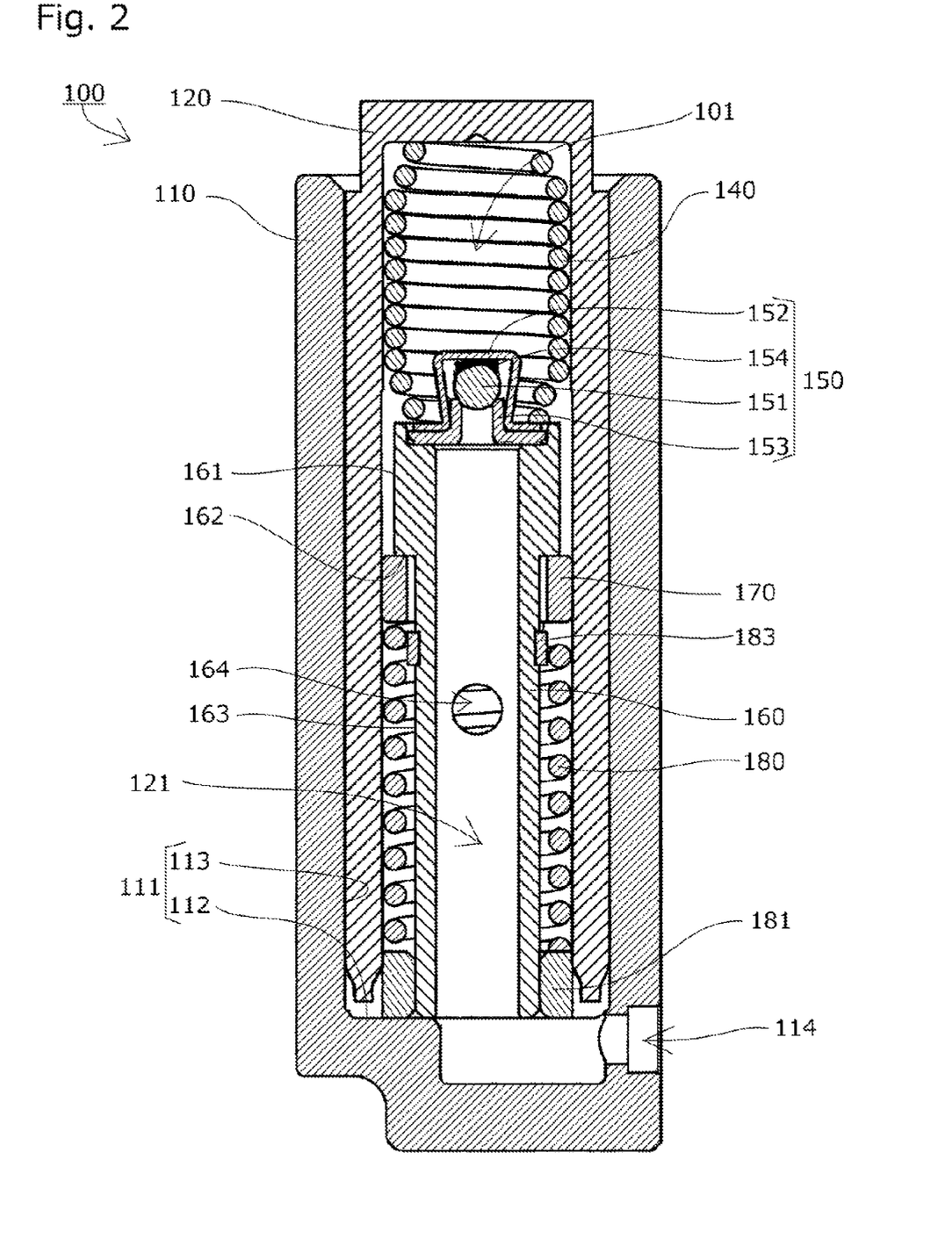
FIG. 2 is a side cross-sectional view of the chain tensioner according to the embodiment of the present invention.

As shown in FIGS. 1 and 2, a chain tensioner 100 according to a first embodiment of the present invention includes: a tensioner body 110 having a cylindrical plunger accommodating hole 111, one end of which is opened; a cylindrical plunger 120 slidably inserted into the plunger accommodating hole 111 (a cylinder surface part 113); and a coil spring 140 serving as urging means compressing or extending freely and accommodated in a pressure oil chamber 101, which is formed inside the plunger 120, in order to urge the plunger 120 in a protruding direction thereof.

Inside the plunger 120, an inner sleeve 160 including a check valve unit 150 provided on the side of the inner sleeve 160 facing the pressure oil chamber 101 to prevent the backflow of oil flowing out of the pressure oil chamber 101 and a pressure regulating unit provided on the outer periphery of the inner sleeve to prevent the pressure inside the pressure oil chamber 101 from having a prescribed value or higher is arranged.

The tensioner body 110 has an oil supply hole 114 through which the oil is supplied from a bottom part 112 of the plunger accommodating hole 111.

Figure 3:
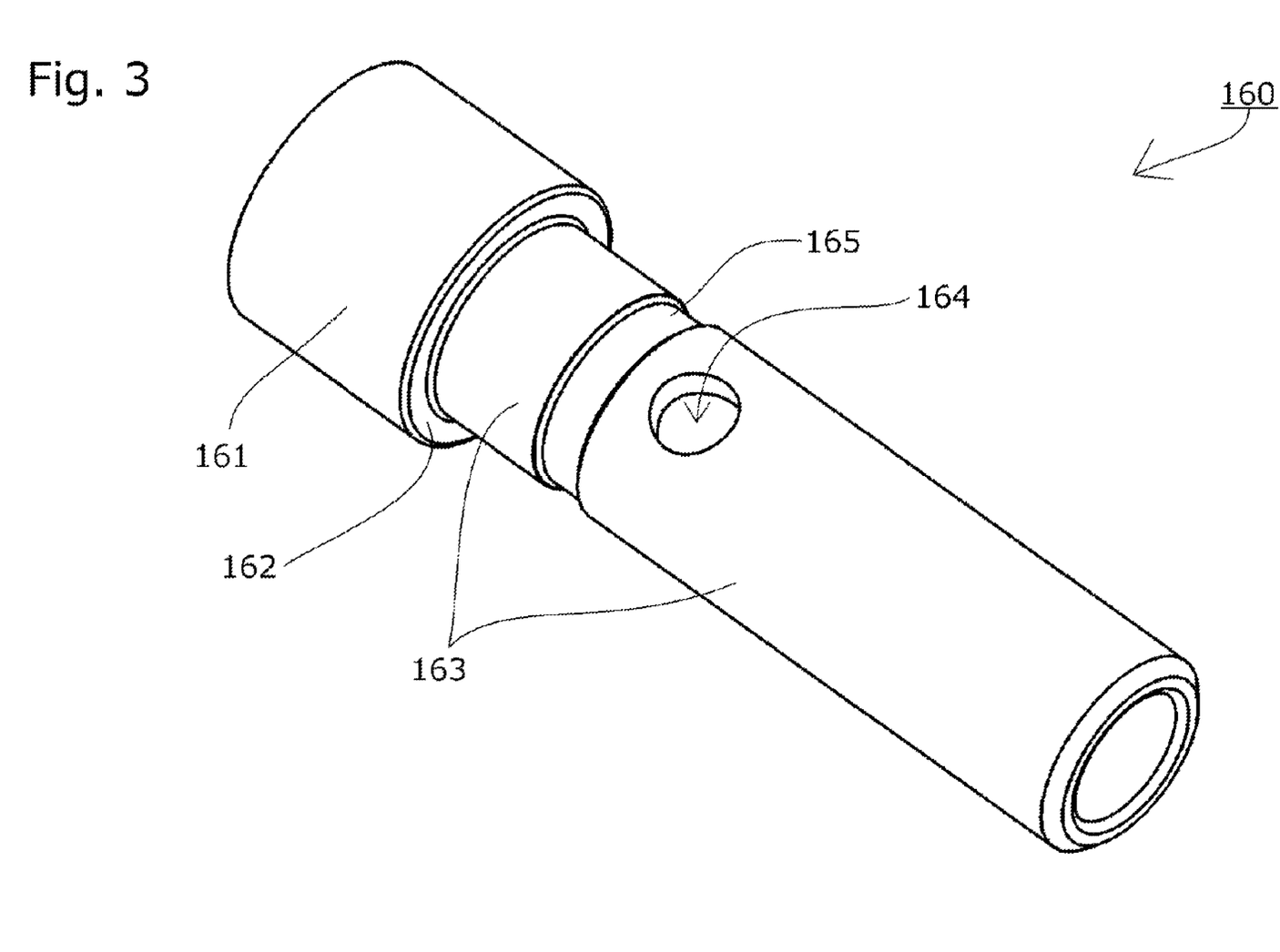
FIG. 3 is a perspective view of the inner sleeve of the chain tensioner according to the embodiment of the present invention.

As shown in FIG. 3, the inner sleeve 160 has a large-diameter part 161 provided on the side thereof close to the check valve unit 150 and a cylinder part 163 with a diameter smaller than that of the large-diameter part 161, and the step of the connecting part between the large-diameter part 161 and the cylinder part 163 constitutes a movement restricting part 162 for a relief valve 170 that will be described later.

In addition, the cylinder part 163 has a reserve hole 164 penetrating between the inner periphery and the outer periphery of the inner sleeve 160.

The pressure regulating unit has the annular relief valve 170 slidably fitted onto the outer surface of the cylinder part 163 of the inner sleeve 160 and slidably contacting the inner surface of the plunger 120 and a relief spring 180 that urges the relief valve 170 to the side of the movement restricting part 162.

Figure 4:
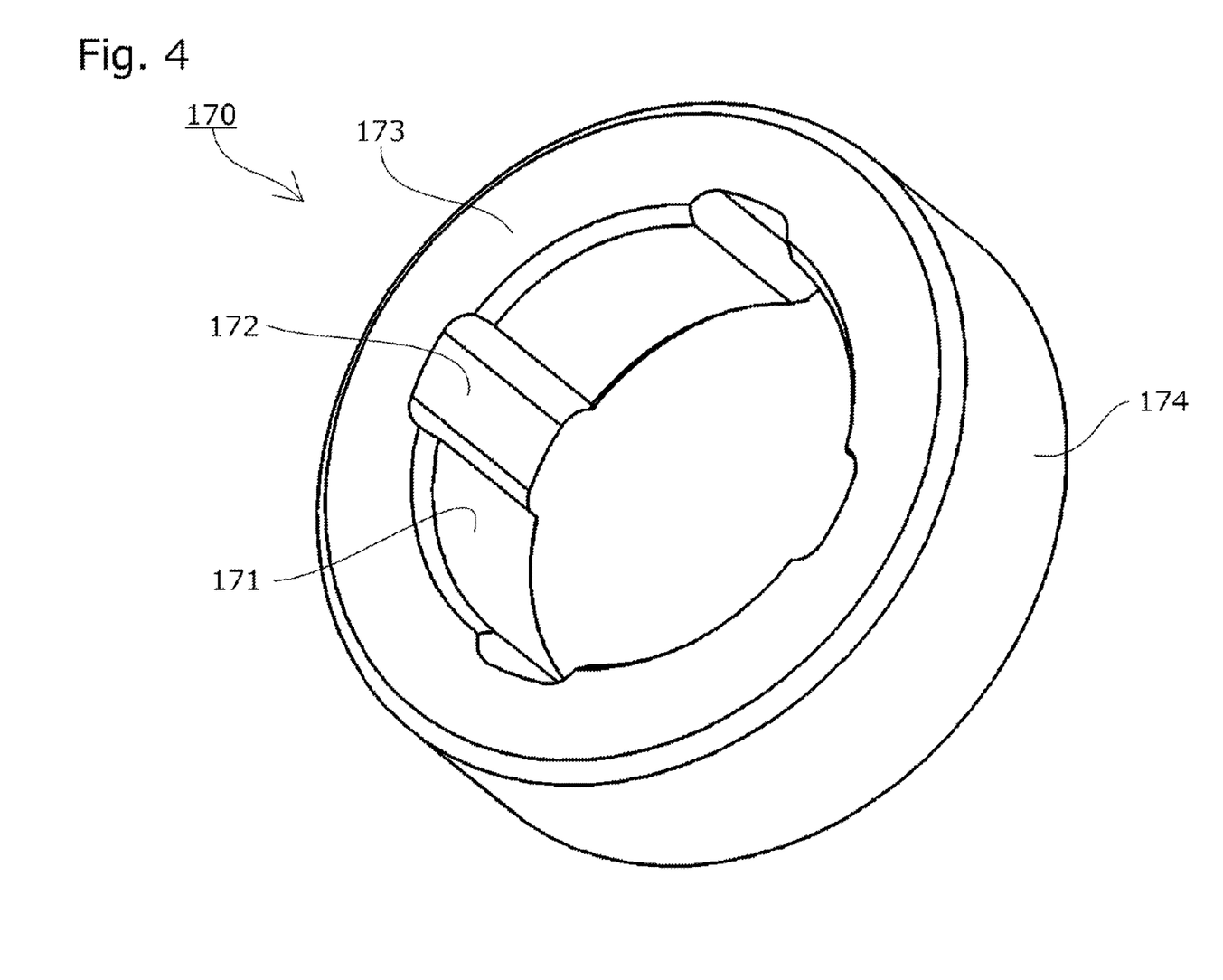
FIG. 4 is a perspective view of the relief valve of the chain tensioner according to the embodiment of the present invention.

As shown in FIG. 4, the relief valve 170 has, on the outer periphery thereof, an outer peripheral sliding contact surface 174 that slidingly contacts the inner surface of the plunger 120. In addition, the relief valve 170 has, on the inner periphery thereof, an inner peripheral sliding contact surface 171 that slidingly contacts the cylinder part 163 of the inner sleeve 160 and a relief groove 172 that allows the flow of the oil in a longitudinal direction thereof on the side of the inner periphery. Moreover, the relief valve 170 has, on the front end surface thereof, a front seal surface 173 that comes in contact with the movement restricting part 162 of the inner sleeve 160 to seal the pressure oil chamber 101.

On the outer periphery of the rear end of the inner sleeve 160, a stopper ring 181 that receives one end of the relief spring 180 is fixed.

In addition, the cylinder part 163 of the inner sleeve 160 has a circumferential groove 165, and the rearward movement of the relief valve 170 is restricted by a rear restricting ring 183 fitted onto the outer surface of the circumferential groove 165.

The check valve unit 150 provided at the front end of the inner sleeve 160 has a check ball 151, a retainer 152 into which the check ball 151 is inserted, a check valve seat part 153 that opens/closes depending on whether or not the check ball 151 is seated on the check valve seat part 153, and a ball press spring 154 that lightly presses the check ball 151 to the side of the check valve seat part 153 inside the retainer 152.

By these configurations, the pressure oil chamber 101 is formed inside the plunger 120 on a front side, that is, the protruding side of the plunger 120, and an oil storage chamber 121 is formed inside and outside the inner sleeve 160 on the rear side.

Note that the chain tensioner 100 according to the embodiment is a so-called ratchet type tensioner but a ratchet may have a known structure and operation. Alternatively, the chain tensioner 100 may not be a ratchet type. Therefore, the detailed description of the ratchet type will be omitted.

A description will be given of the operation of the chain tensioner 100 according to the embodiment of the present invention configured as described above.

When the plunger 120 moves to the protruding side, the oil supplied from the oil supply hole 114 and stored in the oil storage chamber 121 presses up the check ball 151 from the check valve seat part 153 and flows into the pressure oil chamber 101.

When the plunger 120 is pressed, the pressure inside the pressure oil chamber 101 increases. Then, the check ball 151 is pressed against the check valve seat part 153. As a result, the outflow of the oil from, the check valve unit 150 is blocked, and the relief valve 170 is pressed down by the pressure against the pressing force of the relief spring 180.

When the pressure inside the pressure oil chamber 101 becomes pressure having a prescribed value or higher, the relief spring 180 is compressed to retract the relief valve 170. As a result, the front seal surface 173 of the relief valve 170 separates from the movement restricting part 162, whereby the pressure inside the pressure oil chamber 101 is released via the relief groove 172.

Note that without the relief groove 172, the pressure having the prescribed value or higher inside the pressure oil chamber 101 may reduce with a substantial volume change inside the pressure oil chamber 101 accompanied by the movement of the relief valve 170.

In addition, the front seal surface 173, the inner peripheral sliding contact surface 171, and the outer peripheral sliding contact surface 174 of the relief valve 170, the cylinder part 163 and the movement restricting part 162 of the inner sleeve 160, and the inner surface of the plunger 120 may have a groove or the like serving as an orifice.

When the front seal surface 173 of the relief valve 170 separates from the movement restricting part 162 and the pressure inside the pressure oil chamber 101 is released, the oil flows out to the side of the outer periphery of the inner sleeve 160 via the relief groove 172 from the pressure oil chamber 101 without flowing out to an outside.

Since the cylinder part 163 has the reserve hole 164 penetrating between the inner periphery and the outer periphery of the inner sleeve 160, the outside of the inner sleeve 160 also serves as the oil storage chamber 121. As a result, the outflowing oil completely flows back to the oil storage chamber 121.

When the pressure inside the pressure oil chamber 101 reduces to pressure having a prescribed value or lower, the relief valve 170 moves again with the relief spring 180 to make the front seal surface 173 seated on the movement restricting part 162 and maintains its closed state to keep the pressure inside the pressure oil chamber 101.

At this time, the chain tensioner 100 is so structured that the release of the pressure with the relief valve 170 is performed from the oil supply hole 114 toward the oil storage chamber 121 to which the oil is supplied. Therefore, compared with a conventional type in which pressure is released to an outside, a difference in the pressure between the pressure oil chamber 101 and the oil storage chamber 121 becomes smaller and restoration speed for the closed state of the relief valve 170 becomes faster.

In addition, according to the embodiment, the relief valve 170 and the rear restricting ring 183 are fitted in the inner sleeve 160, the relief spring 180 is fitted on the inner sleeve 160 and compressed, and the stopper ring 181 is fixedly fitted in the inner sleeve 160. Thus, the inner sleeve 160 and the pressure regulating unit constituting the oil storage chamber 121 may be configured as one component in advance. As a result, the number of processing parts such as the tensioner body 110 and the plunger 120 and the number of assembling steps for assembling the chain tensioner 100 may be greatly reduced.

Moreover, even in the case of a chain tensioner in which an oil storage chamber is formed inside a plunger on a front side, that is, the protruding side of the plunger, a pressure chamber is formed on the side of the bottom part of a plunger accommodating hole, and oil is supplied from the front side of a tensioner body, a component as described above in which the inner sleeve 160 and the pressure regulating unit are integrated with each other is inserted in a direction opposite to that of the above embodiment. As a result, the chain tensioner 100 is so structured that the release of pressure with the pressure regulating unit is similarly performed toward the oil supply side, whereby the outflow of the oil to an outside may be prevented at the release of the pressure.

The above embodiment describes a specific example of the chain tensioner according to the present invention, but the chain tensioner according to the present invention is not limited to the specific examples. Various modifications other than the modifications of the shapes, the positions, the dimensions, the arrangement relationships, or the like of respective constituents are made possible, or such modifications may be appropriately combined together.

In addition, the above embodiment and the modifications use the illustration, in which the plunger is directed to protrude upward, and the description is provided based on the direction, but the plunger may protrude in any direction according to its use mode.

Particularly, when the chain tensioner is so arranged (in a direction opposite to the direction shown in FIGS. 1 and 2) that the oil storage chamber is positioned over the check valve unit in the above embodiment, the relief valve is positioned over the pressure oil chamber, which is preferable in terms of robust performance for air vent.

In addition, the chain tensioner according to the present invention is not limited to one applied to chain guide mechanisms that perform the sliding guide of a transmission chain such as a roller chain endlessly suspended and wound between sprockets provided at a crankshaft and a camshaft inside an engine room with a traveling guide shoe, but may directly perform the sliding guide of a chain with the tip end of a plunger. Moreover, the chain tensioner according to the present invention may be applied to similar transmission mechanisms with a belt, a rope, or the like besides transmission mechanisms with a chain and is available in various industrial fields.

What is claimed is:

1. A chain tensioner comprising:
   a tensioner body having a cylindrical plunger accommodating hole, one end of which is opened;
   a cylindrical plunger slidably inserted into the cylindrical plunger accommodating hole; and
   urging means compressing or extending freely and accommodated in a pressure oil chamber, which is formed inside the cylindrical plunger, in order to urge the cylindrical plunger in a protruding direction thereof on a front side, wherein
   an inner sleeve is arranged inside the cylindrical plunger,
   the inner sleeve has a check valve unit provided on a side of the inner sleeve facing the pressure oil chamber to prevent backflow of oil flowing out of the pressure oil chamber, and a pressure regulating unit provided on an outer periphery of the inner sleeve to prevent pressure inside the pressure oil chamber from having a prescribed value or higher,
   the inner sleeve has a cylinder part and a movement restricting part provided on the side of the inner sleeve facing the pressure oil chamber,
   the pressure regulating unit has an annular relief valve slidably fitted onto an outer surface of the cylinder part and slidably contacting an inner surface of the cylindrical plunger and a relief spring urging the annular relief valve to a side of the movement restricting part, and
   the annular relief valve has, on an inner periphery thereof, an inner peripheral sliding contact surface slidingly contacting the cylinder part and a relief groove allowing flow of the oil in a longitudinal direction thereof.

2. The chain tensioner according to claim 1, wherein
   the pressure regulating unit has a stopper ring fixed on the outer periphery of the inner sleeve and receiving the relief spring.

3. The chain tensioner according to claim 1, wherein
   the inner sleeve has a reserve hole penetrating between an inner periphery and an outer periphery of the cylinder part, the outer periphery of the cylinder part including the outer surface of the cylinder part.

* * * * *